O. THIEME.
CALCULATING MACHINE.
APPLICATION FILED DEC. 17, 1912.
1,143,241.
Patented June 15, 1915.
9 SHEETS—SHEET 3.
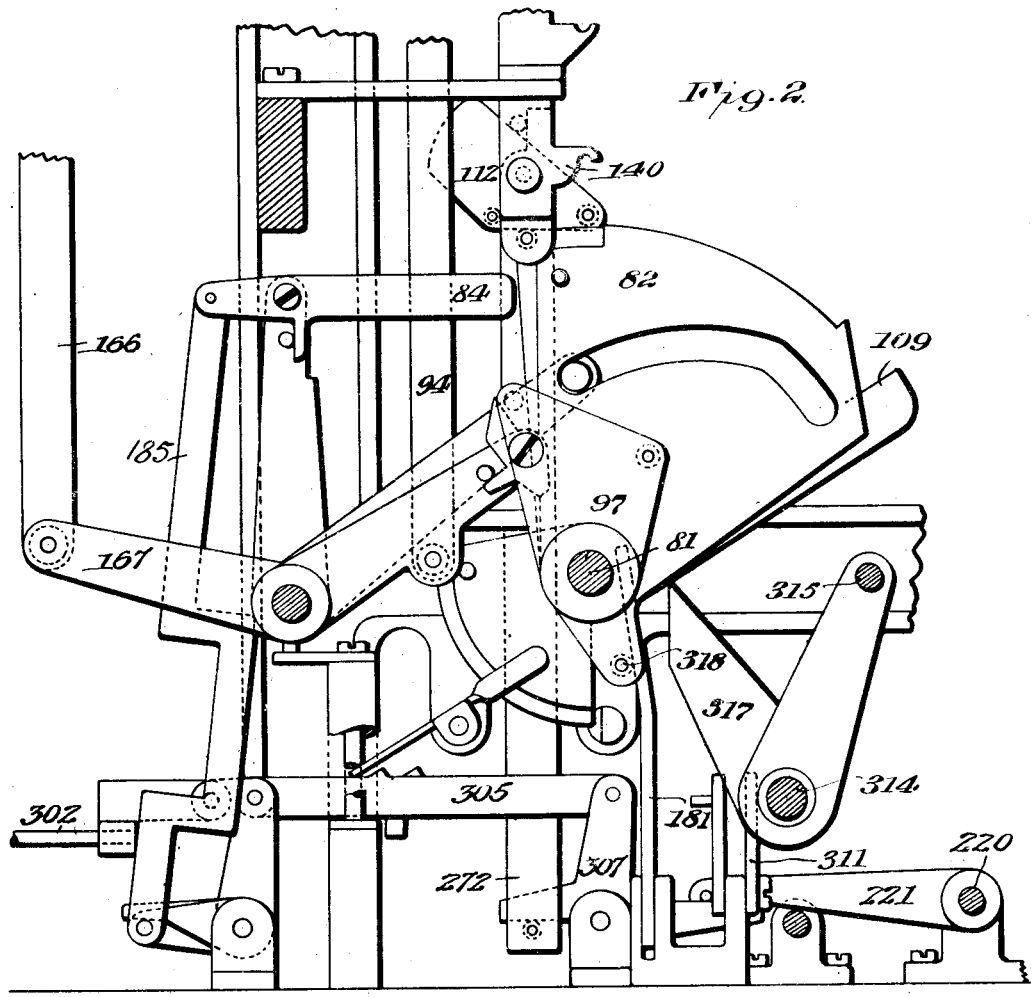
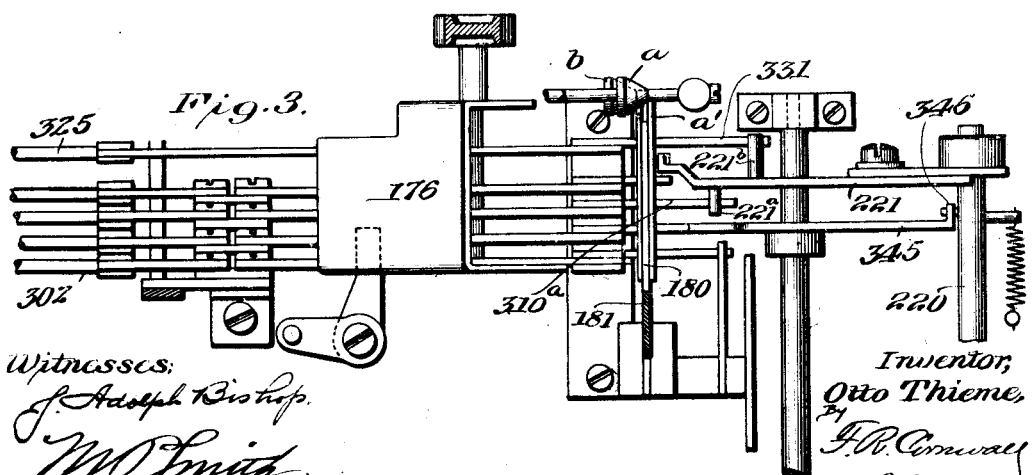

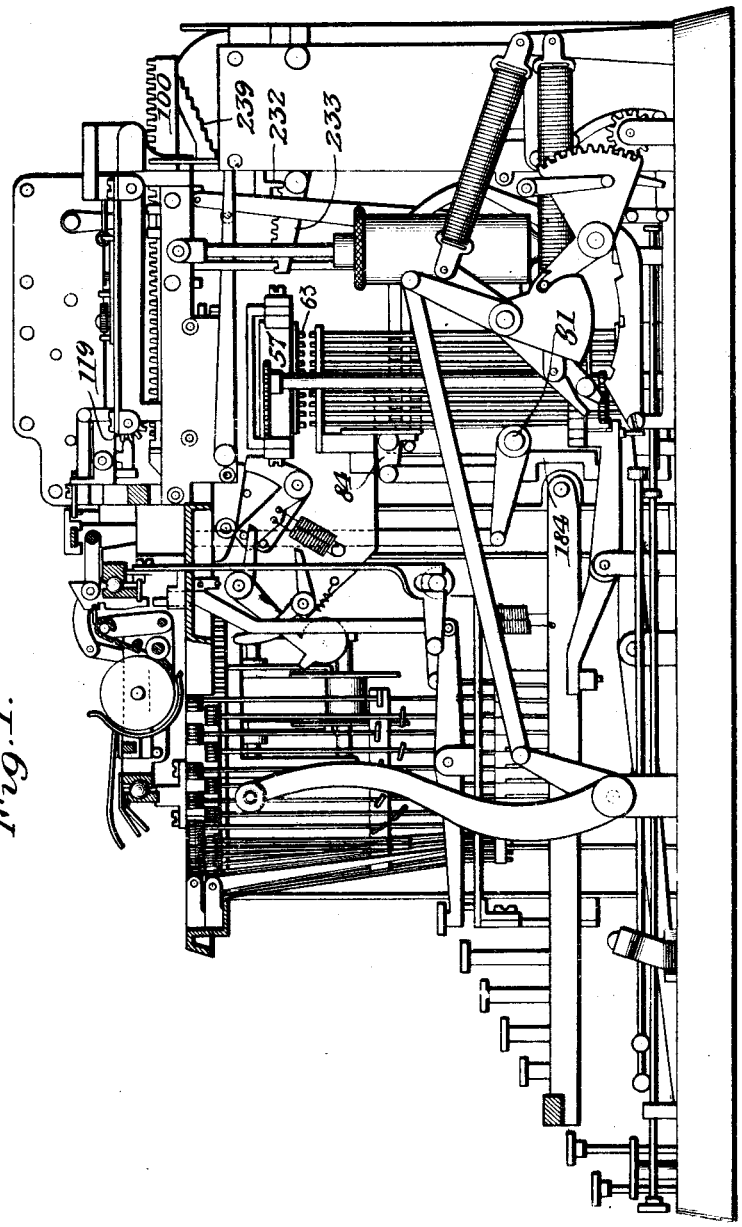

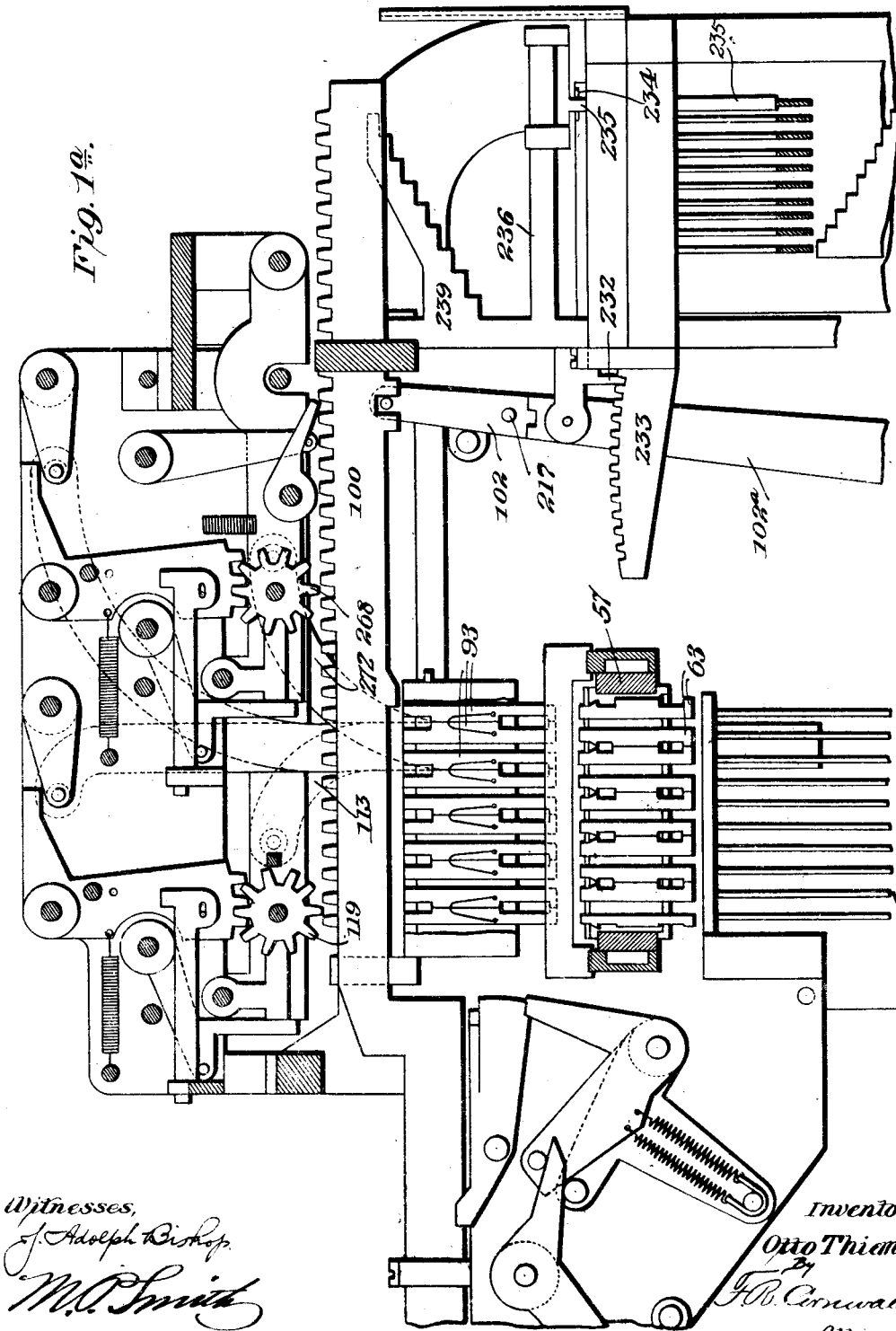

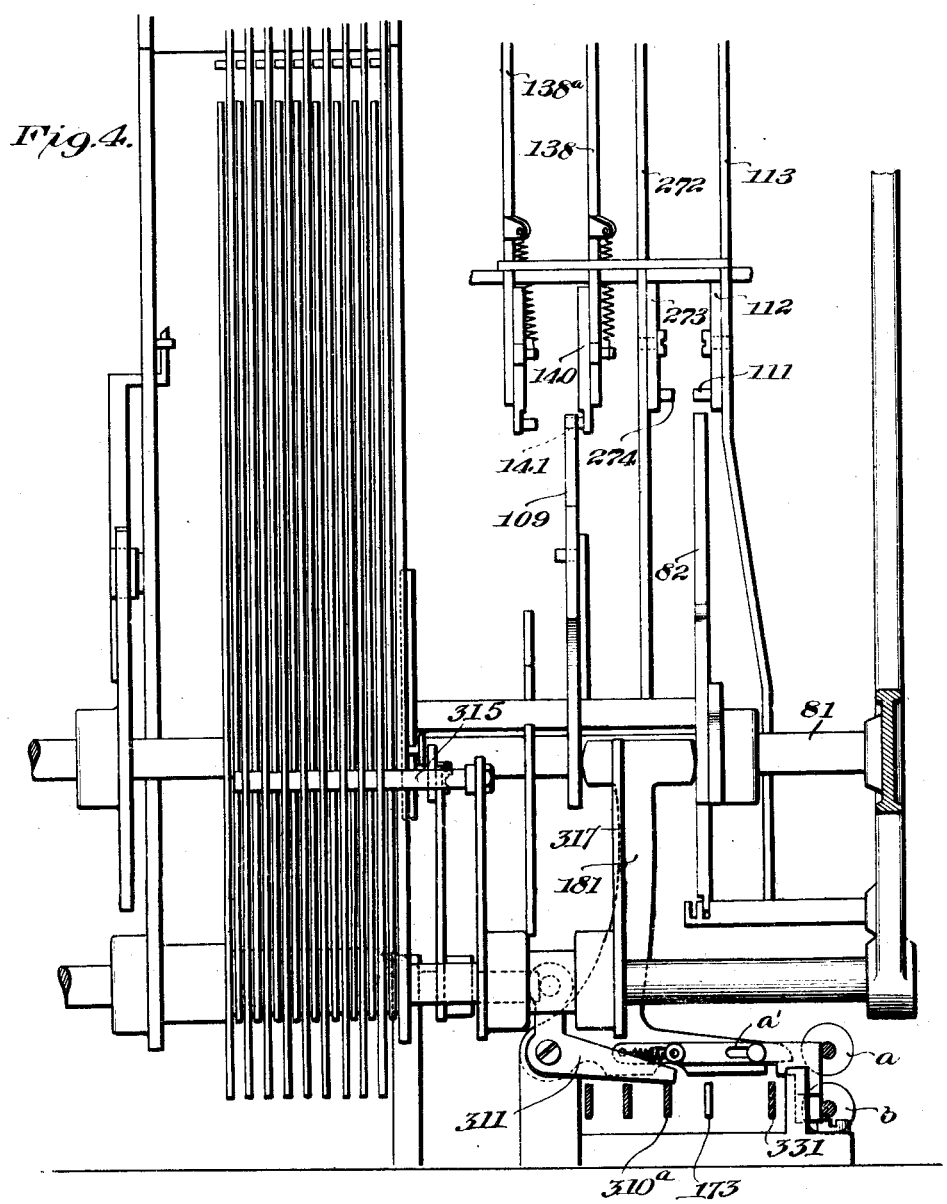

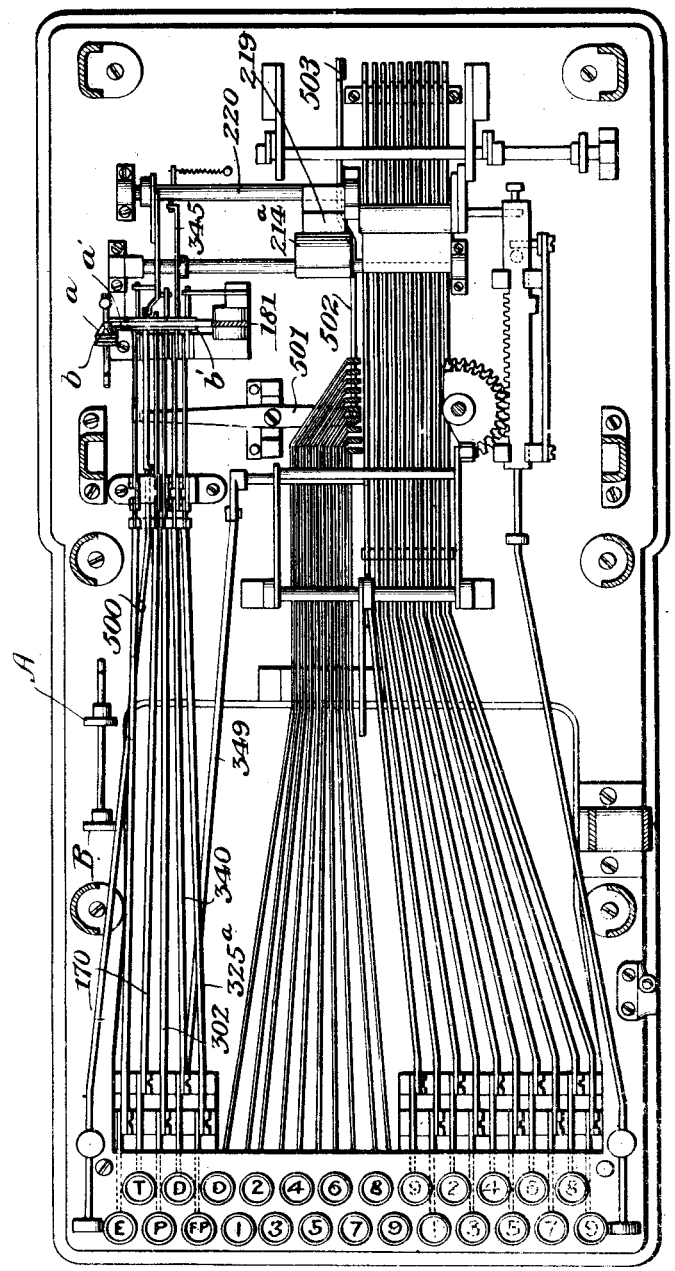

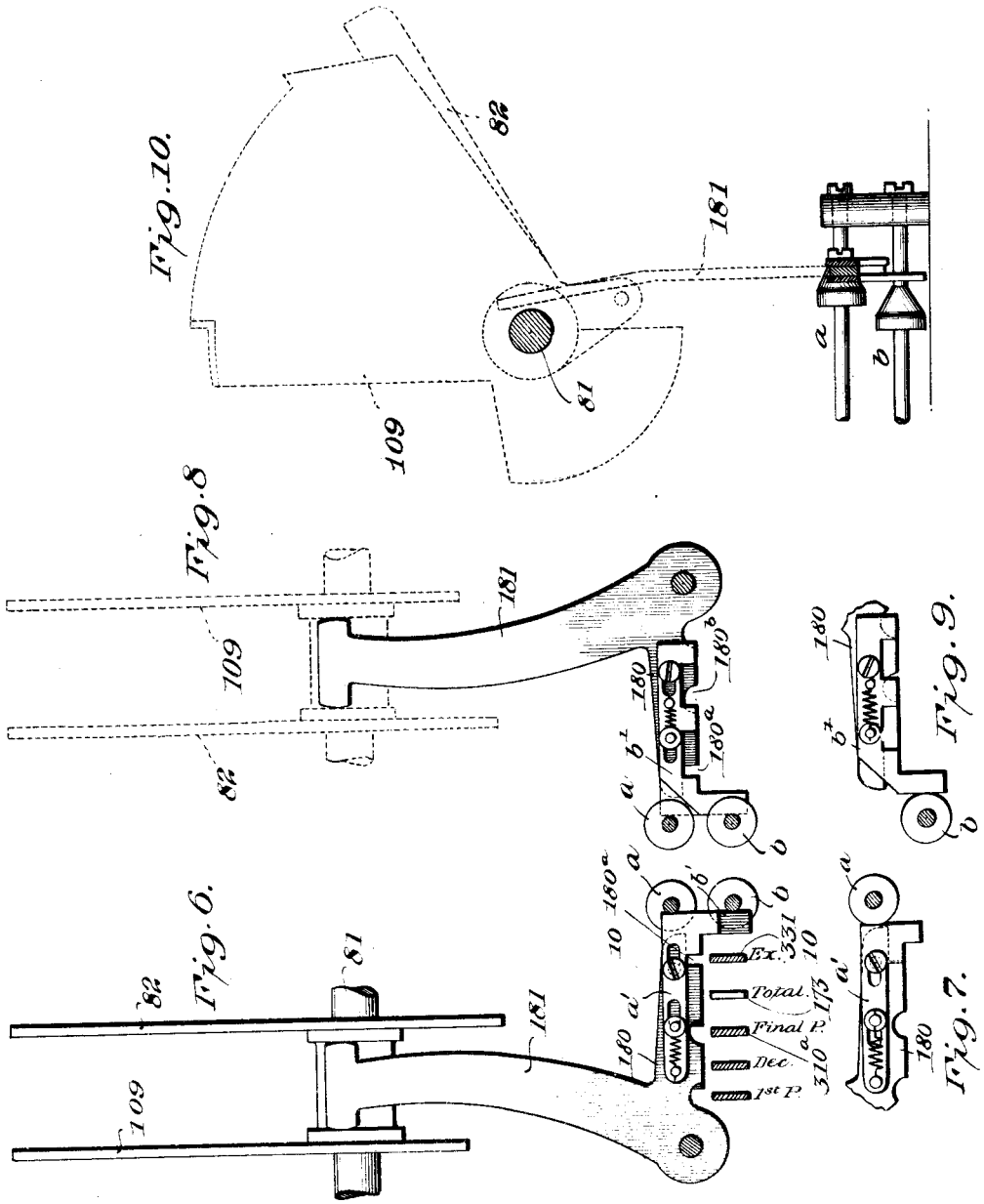

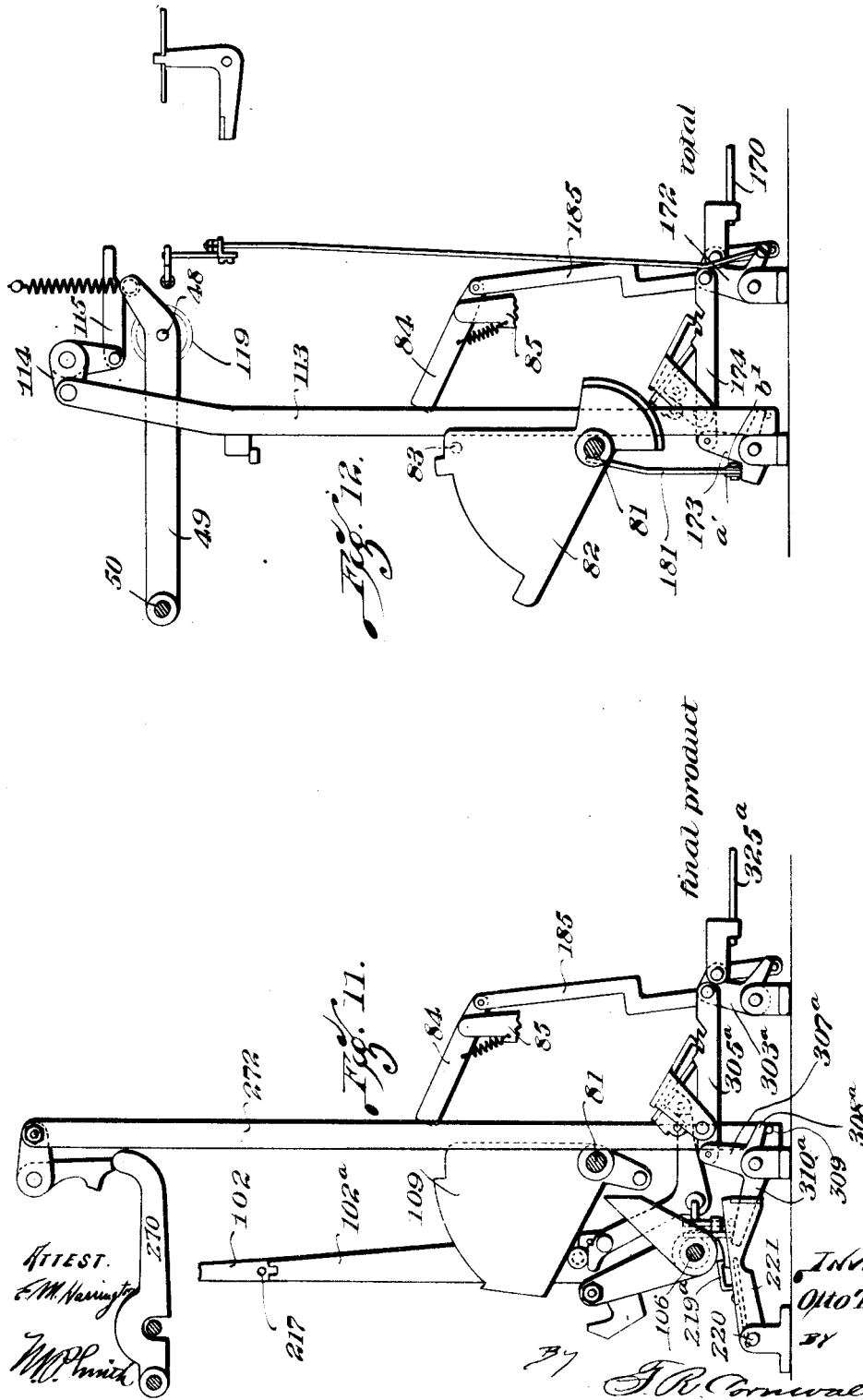

O. THIEME.
CALCULATING MACHINE.
APPLICATION FILED DEC. 17, 1912.
1,143,241.
Patented June 15, 1915.
9 SHEETS—SHEET 8.
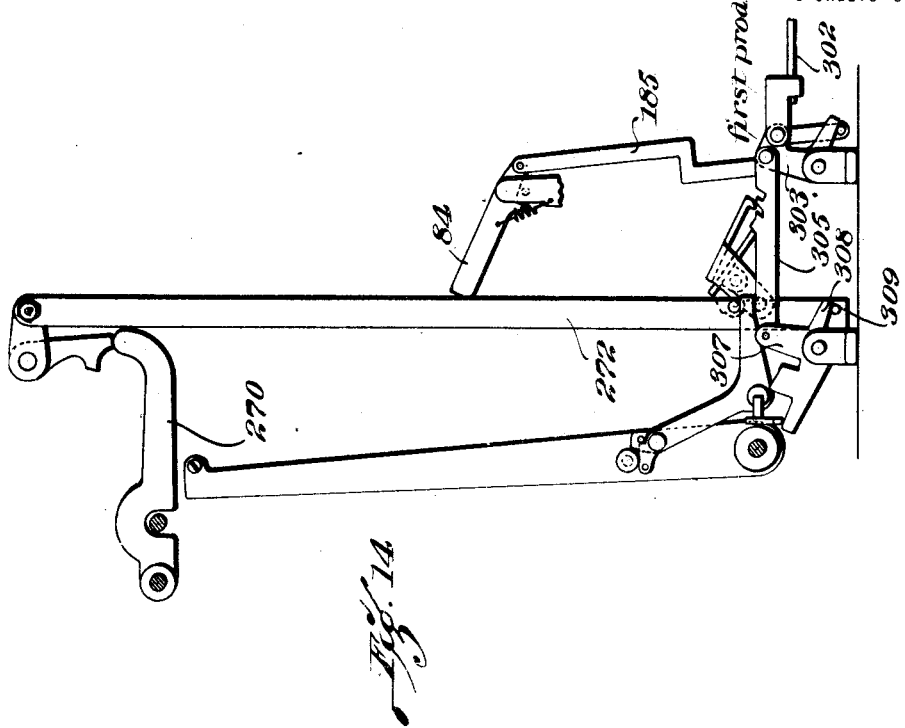
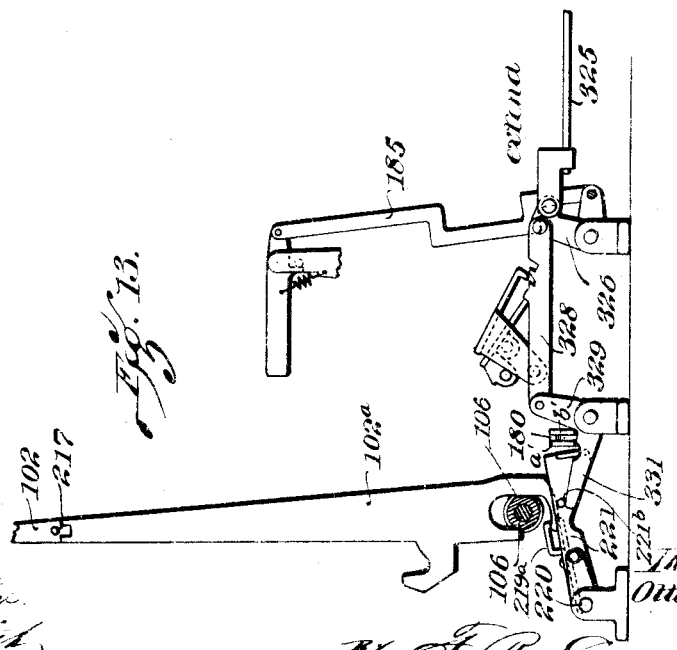

O. THIEME.
CALCULATING MACHINE.
APPLICATION FILED DEC. 17, 1912.
1,143,241.
Patented June 15, 1915.
9 SHEETS—SHEET 9.
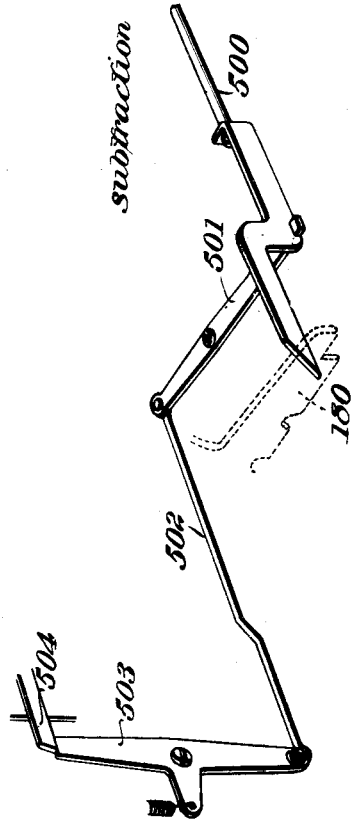
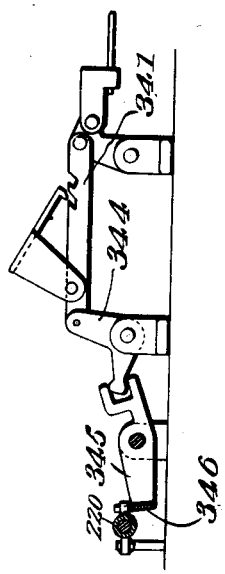
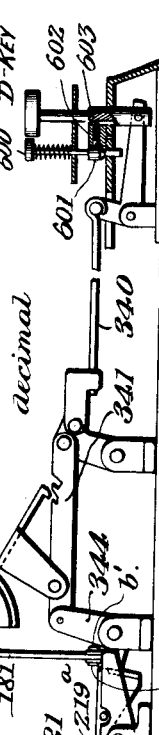
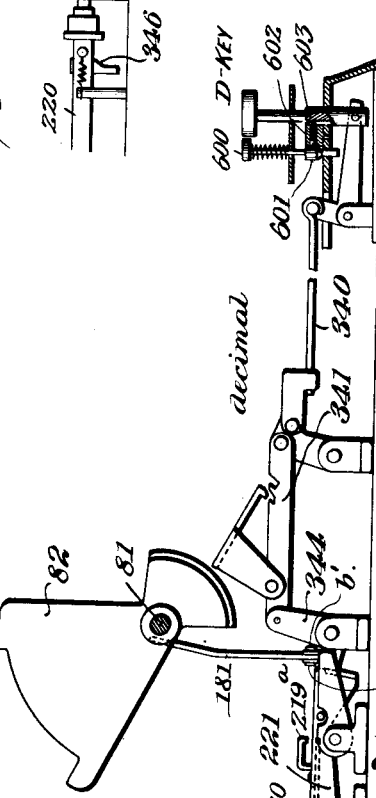

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,143,241. Specification of Letters Patent. Patented June 15, 1915.

Application filed December 17, 1912. Serial No. 737,185.

*To all whom it may concern:*

Be it known that I, OTTO THIEME, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a side elevational view of the machine as seen from the left. Fig. 1ᴬ is a vertical sectional view through the upper rear portion of the machine as seen from the left. Fig. 2 is a side elevational view of the mechanism located at the lower rear end of the machine as seen from the left. Fig. 3 is a plan view of the devices connected to the rear ends of the result keys. Fig. 4 is a rear elevational view of several of the parts shown in Fig. 2. Fig. 5 is a plan view showing the keys and their connections. Fig. 6 is a rear elevational view showing the means in the form of a bell crank for shifting the cams 82—109. Fig. 7 is a view illustrating the lower member of the bell crank with its blocking plate in a different position. Fig. 8 is a front view of the shifting bell crank showing a blocking plate mounted on the front side thereof. Fig. 9 is a detail view showing a changed position of said blocking plate. Fig. 10 is a sectional view through line 10—10 of Fig. 9. Fig. 11 is an elevational view of the parts controlled by the "F. P." or "final-product key." Fig. 12 is a similar view of the parts controlled by the "T" or "total key." Fig. 13 is a similar view of the parts controlled by the "E" or "extension key." Fig. 14 is a similar view of the parts controlled by the "P" or "first product" key. Fig. 15 is a detail view of certain of the parts coöperating with the "S" or "subtraction" key. Fig. 16 is a detail view of the parts coöperating with the "D" or "decimal" key. Fig. 17 is a similar view of the parts coöperating with the "D" key. Fig. 18 is a rear view of parts shown in Fig. 17.

This invention relates to a new and useful improvement in calculating machines of that type illustrated in Belgium Patent #202,081, dated August 21, 1907, French patent, Hubert Hopkins, No. 383,719, dated January 16, 1908, and also in an application serially numbered 310,739, filed by Hubert Hopkins in the United States Patent Office on or about April 9, 1906. While the present improvements are designed to be applied to the machine in said patents and application, it will be understood that by obvious alterations and changes these improvements could be applied to other types of calculating machines, and I do not wish to be understood as limiting my invention to the particular machine shown. In the machine shown in said patents and application there are three groups of accumulating wheels 119 laterally movable with respect to the actuating racks 100, and a group of accumulating wheels 268, also laterally movable in a step by step operation, with respect to the racks 100, which step by step movement is incident to the operations of multiplication. The machine shown in said patents is of the traveling carriage type in which rows of setting-up pins 63 in said carriage are successively brought under control of the ten keys representing zero and the nine digits, and when the pins are set up to represent the number in the carriage said carriage is lifted upon the initial forward stroke of the handle so as to position stop pins 93 in a stationary field of stops. The racks move forwardly while out of engagement with the wheels 119 or 268, and when the handle reaches its forward limit of movement either set of wheels 119 or 268 is engaged with the racks and the number represented by said racks may be introduced into either set of accumulating wheels. The normal operation of the machine is to introduce and accumulate numbers into a group of wheels 119 without operating any of the result keys; but to introduce a number into the wheels 268 in additive operations the D or decimal key is depressed to move the cams 82—109 to their third position so as to place them in control of said wheels 268 and out of control of the wheels 119. Normally, when no result key is depressed, the cams 82—109 are in control of the wheels 119 and act to engage said wheels with the racks after the racks have reached their forward limit of movement, said wheels remaining in engagement with the racks during the return movement of the latter, the wheels being disengaged from the racks just before the handle reaches its home position.

To obtain a total from the wheels 119 the 110

T key is depressed, before the handle is pulled. The T key moves the cams 82—109 to their second or neutral position and also engages the wheels 119 with the racks so that said wheels will be reversely rotated by the forward movement of the racks and until their tripping projections engage the zero stops of the carrying mechanism whereby the total formerly represented by said wheels will be transferred to the racks, which racks will now be in position to print the total. If the total key is permitted to rise when the handle is forward wheels 119 will stand clear or at zero; or if the total key is held depressed the wheels 119 will be rotated by the backward movement of the racks and the total re-introduced thereinto.

To obtain a total of numbers accumulated in the wheels 268 or to print a product represented in said wheels as a result of multiplying operations the P key is depressed, but this P key does not in the structure disclosed in said patents, move the cams 82—109 to their second or neutral position. The P key engages the wheels 268 with the racks so that when the handle is moved forward the racks will reversely rotate the wheels 268 until said wheels represent zero, whereupon the number formerly represented in said wheels will be transferred to the racks and a record may now be made of such total or product. If the P key is released when the handle is forward the wheel 268 stands clear, or if the P key is held depressed while the racks and handle are moving backward the number will be re-introduced therein. It will thus be seen that in the machine disclosed in said patents a product or series of numbers introduced into the wheels 268 and therein accumulated will, when said product or total is obtained from said wheels, be transferred to and introduced in a set of wheels 119. The wheels 268 are principally used to accumulate units and tens partial products in the operation of multiplication and in making out invoices where, for instance, a number of yards is multiplied by the price per yard, these extensions, as they are called, are accumulated in a set of wheels 119 so that the total or footing of said extensions may be printed at the bottom of the column thereof. Ordinarily, in thus carrying out extensions, it is not desirable to hold the P key depressed so as to re-introduce the product or total into the wheels 268 because by so doing it would be accumulated with the next succeeded product, and when the sum of these two totals or products was obtained said sum would be accumulated in the wheels 119 and because of such repeated transfer of the same number the wheels 119 would not represent the correct total. In the machine under consideration, disclosed in said patents, it is also practically impossible to operate the T key before the handle is pulled so as to reversely rotate the wheels 119 the same distance they will be rotated when the racks move rearwardly to introduce a product from the wheels 268, thereinto, for two reasons,—first, any wheel 119 standing at zero or to represent any digit smaller than the digit of corresponding denominational order in the wheels 268, would prevent the rack in that denomination from moving forward the proper distance; and second, the depression of the T key would move the cams 82—109 to their second position, whereas when the P key is depressed it is intended that said cams shall remain in their first or normal position.

In the machine shown in the accompanying drawings, the "T" key and its connections operates substantially the same as the "T" key of the aforesaid patents and application. The "D" key, when fully depressed, also operates substantially the same, so far as its function of throwing out the escapement mechanism of the carriage 57, so as to place a "decimal rack bar" under control of the key board, is concerned, and said "D" key after a number has been set up on the key board will, when depressed, shift the cams 82—109 to their third position so as to introduce said number into the rear totalizer wheels 268. This operation is also similar to that described in the patents and application referred to. Means are provided, however, in the present instance to arrest the "D" key when depressed half way so that the cams may be moved to their central or neutral position and the "final product key" depressed so as to restore the pendants and leave the product or total in the wheels 268, as the "D" key, in arresting the carriage escapement mechanism to introduce decimals into the machine, must be released to have said decimals accumulated in the wheels 268. No latch is provided to hold the "D" key in its depressed position, as is used in connection with all of the other result keys, said latch being operated by the power shaft to release the keys after the racks reach the forward limits of their movement.

The "E" or extension key, in the patents and application referred to, did not shift the cams 82—109 to their neutral position but permitted said cams to remain in their first position with the result that when a number was set up on the key board, the "E" key depressed and the machine operated, said number would be represented by the pendants and also introduced into a group of wheels 119. In the present case, when the "E" key is depressed, the cams are shifted to their neutral position and consequently the number set up on the key board can not be introduced into the group of wheels 119 but is represented by the pendants 235. The "E" key in the patents and application aforesaid, used to obtain the product or total accumulated in the wheels 268, when depressed, would not shift the cams 82—109 and consequently the number represented on said wheels will be introduced into the group of totalizer wheels 119. In the present instance, there are two keys for controlling the wheels 268. With respect to obtaining the product or total therefrom, one of these designated as the "first product key" performing the function of the "P" key referred to with the exception that, when operated, it does not effect restoration of the pendants, but leaves said pendants set up to represent a multiplicand for another or succeeding operations of multiplication; or the number represented by the pendants may be used as a subtrahend and be subtracted from the number represented by the wheels 268. When the "first product key" is operated, the multiplicand will be left in the pendants 235, the wheels 268 cleared or returned to zero and the number represented in the wheels 268 transferred to a group of wheels 119.

The second product key, designated as the "final product key" will, when operated, effect the restoration of pendants 235 and clear the wheels 268 when the number therein represented is transferred to a group of wheels 119. There are three additional keys shown in the drawings which are not disclosed in the patents and application referred to. These keys are located at the left-hand side of the machine and for want of space in the key board are not connected to bell crank levers, as are the other keys, but are in the form of push rods.

The "S" or subtraction key when a number is represented in the pendants 235 will, when pressed rearwardly and the machine operated, subtract the number represented in the pendants 235 from the number represented in the wheels 268, the wheels 268 containing the correct remainder at the end of such subtracting operation.

The key marked "A" will, when pressed rearwardly, place the cams 82—109 under control of the "E" or extension key whereby the number set up on the key board may be represented in the pendants 235 and not be introduced into a group of wheels 119; or, if said "A" key is pulled forward, the number introduced into the pendants will be also introduced into a group of wheels 119.

The key marked "B" when pushed rearwardly will enable the number represented in the wheels 268 to be printed without being introduced into a group of wheels 119, the wheels 268 standing clear at the end of the operation unless the first or "final product key" is held down while the racks are moving rearwardly. When the "B" key is pulled forward a number represented in the wheels 268 will be transferred to a group of wheels 119 when the first or "final product key" is depressed, said wheels 268 standing clear at the end of such operation or having the number re-introduced thereinto by holding the first or "final product key" depressed during the backward movement of the racks.

Many of the parts shown in the accompanying drawings are substantially the same in construction and function as corresponding parts shown in the patents and application aforesaid and, wherever practicable, I have employed the same reference numerals to refer to such corresponding parts.

81 indicates a shaft on which the cams 82—109 are slidingly mounted, said cams being connected together by a hub portion, as shown in Fig. 4, and between the cams is arranged the head of a lever 181. Lever 181 is in the form of a bell crank pivoted to a bracket secured to the base plate of the machine (see Fig. 2), its horizontal member being notched in its lower edge as shown in Figs. 7 and 9, these notches being located over the rear ends of certain bell crank levers operated by the result keys now to be described.

The "T" or total key (see Fig. 12) is connected by a rod 170 to a bell crank 172, the forwardly extending member of which cooperates with a pin or link 185, the upper end of which link is connected to a tappet 84 whereby when the "T" key is depressed, link 185 raises the rear end of tappet 84 out of the path of movement of pin 83 on cam 82. Thus the arm 85 carrying the tappet 84 is not operated and the laterally movable carriage 57 containing the pins 63 is not raised to position any of the stops 93. The upper end of the bell crank lever 172 is connected by a link 174 to a T-shaped lever 173 whose forwardly extending projection lies over the pin on the lower end of bar 3, which bar is connected at its upper end to a bell crank lever 114 operating a cam faced bar 115 tending to move the same forwardly when the "T" key is depressed so as to lower the frame 49 pivoted on shaft 50 in which shaft 48 carrying the wheels 119 is slidingly mounted.

The rearward extension of the T-shaped lever 173 lies under the horizontal member 180 of the bell crank but not in line with any notch on the lower edge thereof, as shown in Fig. 6, whereby when the "T" key is depressed, the bell crank 180—181 is shifted to its central or neutral position locating the cam 82 between the pins 111 and 274, whereby when this cam is rocked, neither the rod 113 will draw the forward totalizer wheels 119 into mesh with the racks at the beginning of the rearward excursion of the racks, nor the rod 272 draw the rearward totalizer wheels 268 into mesh with the racks as would ordinarily be done if the cam occupied its first or third position. The operation of the tappets 112 on the rod 113, and 273 on the rod 272, which tappets carry the pins 111 and 274, is fully described in the patents beforementioned and therefore such description need not be repeated here. Likewise, when the "T" key is depressed, cam 109 which normally coöperates with pin 141 on tappet 140 carried by rod 138, will be shifted out of alinement with said pin 141 and not operate the rod 138. Rod 138 is connected to the carrying mechanism identified with the wheels 119 and will restore or reset said carrying mechanism when the cam 109 is in the position shown in Fig. 4. When shifted to its third position as by the depression of the "D" key, cam 109 will be moved out of control of bar 138 and placed in control of bar 138ª, which latter coöperates with the carrying mechanism for the wheels 268, all of which is described in the beforementioned patents.

From the above description, it will be observed that when the "T" key is depressed, the rod 113 is drawn downward so as to engage the wheels 119 with the racks before said racks start forwardly and the cams 82—109 are shifted to their central or neutral position so that they will not mechanically operate to engage or disengage the front or rear totalizers with the racks nor will they operate to reset the carrying mechanism for either the front or rear totalizers.

The "D" key and its connections are shown in Figs. 16, 17, and 18. The rod 340 which is operated by the "D" key is connected to a link 341 in turn connected to a bell crank lever 344, whose rearwardly extending member is provided with a head (see Fig. 17) which engages a slot in the forward end of the lever 345, the rear end of said lever having a cam faced lateral projection 346 which engages a pin on shaft 220 so as to move said shaft laterally whenever the "D" key is depressed. Shaft 220 carries a plate 219 (see Fig. 5) to which is secured an overhanging plate 219ª, the latter extending over and engaging the rearwardly extending curved fingers at the lower ends of the supplemental bars 102ª. These bars are slotted at their lower ends where they engage the shaft 106 so that said bars may be raised when the plate 219 is rocked upwardly. When the supplemental bars are raised, (see Fig. 11) the slots in their upper ends receive pins or lateral projections 217 on the main levers, which latter are connected to the racks and partake of the movement thereof. Each supplemental bar 102ª has a link 231 pivotally connected thereto (see Fig. 1ᴬ) which link is provided with a tooth 232 coöperating with a notched upper edge of a segmental plate 233, there being one such plate for each supplemental bar. Link 231 has lateral projections 234 at its rear edge for engaging the pendant 235, said pendant being slidingly mounted upon the rearwardly projecting track extension 236 arranged upon the stepped stop bar 239. Hence when the plate 219 is raised all of supplemental bars 102ª are locked to the main levers 102 and as the racks move forward against the positioned stop pins 93, the pendants 235 will be correspondingly positioned. When the plate 219 is lowered, the teeth 232 will engage the segmental plates 233 and lock the pendants in position. When the "D" key is depressed to move the shaft 220 laterally, plate 219 is correspondingly moved, but this movement is idle and meaningless. However, the rock arm 221 mounted on shaft 220 is moved laterally for the purpose of locating the pin 221ª carried by the forward end thereof out of alinement with the bell crank lever 310ª operated by the "final product key". In this manner, the "D" key may be depressed half way and the "final product key" pressed for the purpose of restoring the pendants without clearing any of the totalizer wheels. Means for holding the "D" key in its half-way depressed position, is shown in Fig. 16, where it will be seen that the spring pressed plunger 600 is arranged alongside of the "D" key, the stem of which plunger carries a cone-shaped head 601, which coöperates with a pin 602, said pin being held against the cone-shaped head by means of a spring. When the "D" key and the plunger 600 are simultaneously depressed the horizontally movable pin is moved under the shoulder 603 on the "D" key and consequently the simultaneous depression of the "D" key to be arrested in its half-way position; whereas, if the plunger is not depressed and the "D" key alone is operated, the pin 602 will not be arrested under the shoulder of the "D" key and hence said "D" key can be fully depressed. The half-way depression of the "D" key places the cams 82—109 in their neutral position and also moves the shaft 220 so that its arm 221 will not be operated when the "final product key" is depressed. The "D" key is also connected by a rod 349 to the escapement mechanism which controls the laterally movable carriage.

The depression of the "E" key (see Fig. 13) will operate rod 325 connected at its rear end to lever 326, in turn connected by link 328 to a bell crank lever 329. The rearwardly extending member 331 of this bell crank lever 329 lies under a pin 221ᵇ on a rock arm 221 so that whenever the "E" key is depressed, shaft 220 will be rocked and the supplemental levers 102ª raised into engagement with the pins 217 on the main levers 102, thus connecting the pendants with the racks so that the pendants will be positioned according to the position of the racks and the number represented by the racks in their forward position will also be represented by the pendants when the "E" key is released to disengage the pendants from the racks when the handle reaches the forward limit of its movement. The extension 331 of this "E" key normally lies under a notch in a horizontal member of the cam shifting bell crank 180 and when the "A" key is pulled forward its cone "a" will permit the blocking plate a' to be moved outwardly so as to open the notch 180ᵃ. When the notch is thus opened (see Fig. 6), the operation of the "E" key will not shift the cams 82—109 and consequently, any number set upon the key board when the "E" key is depressed and the handle pulled, will not only be set up or represented by the pendants 235, but will be registered in one of the groups of wheels 119, because cams 82—109 are not shifted.

If it is desired to set up a number from the key board in the pendants 235 and not introduce that number into any group of wheels 119, the key "A" is pressed rearwardly whereby its cone q will move the blocking plate a' to the position shown in Fig. 7 whereby when a number is set upon the key board and the "E" key is depressed, the bell crank 180—181 will be rocked to shift the cams 82—109 to their neutral position so that, when the handle is pulled, the number set upon the key board and introduced into the pendants 235, will not be introduced into a group of wheels 119.

The "P" or "product" key and its connections are illustrated in Fig. 14 and as stated above in the patent referred to, the function of this key was when depressed to cause the wheels 268 to be meshed with the racks upon the forward movement of the handle so as to yield a total or product from said wheels and at the same time, introduce said total or product into a group of wheels 119.

The "B" key shown in Fig. 5 is connected by a rod to a cone b, which cone b coöperates with a blocking plate b' (see Fig. 8).

The "P" key shown in Fig. 14 is connected by a rod 302 to a bell crank 303 whose forward extension when the "P" key is depressed, depresses the rod 185 and raises the tappets 84 out of the path of the pin 83 on cam 82 for purposes heretofore described. Bell crank 303 is connected by link 305 to a T-shaped lever 307 whose forwardly extending portion 308 engages the pin 309 and depresses the rod 272, whereby the frame 270 carrying the rear totalizer wheels 268 is depressed and a set of wheels engaged with the racks whenever the "P" or "first product" key is depressed. Upon the depression of this "P" key, if the key "B" is pulled forward so that the blocking plate b' uncovers the notch 180ᵇ in the horizontal member 180 of the cam shifting lever, as shown in Fig. 8, then the total or product contained in the wheels 268 will be transferred to and registered in a group of wheels 119. If, however, the key "B" is pushed rearwardly before the "P" key is operated so as to close the notch above the T lever 307 operated by the "P" key, as shown in Fig. 9, the depression of the "P" key will rock the cam shifting lever moving the cams 82—109 to their central or neutral position in which a number contained in the wheels 268 will be yielded but not introduced into a group of wheels 119. The wheels 268 will stand clear at the end of the operation if the "P" key is permitted to rise when the handle reaches the forward limit of its movement; or if the "P" key is held depressed, the number will be retained in the wheels 268. The operation of the "P" key in the present construction does not shift any of the moving parts into control of the restoring bar 315 (see Fig. 2) which coöperates with the extensions 316 of the supplemental bars 102ᵃ to restore the pendants 235 to zero position. In the aforesaid patents, whenever the "P" key is depressed, the restoring bar 315 will be operated and the pendants restored. In my present construction, the operation of the "P" key will not place the restoring bar 315 under control of any of the moving parts of the machine, and consequently, the pendants will be left set up to represent a multiplicand or subtrahend, as the case may be, and this number may be again used for subsequent operations of multiplication or subtraction. In other words, when the "P" key in the present construction is operated, a product may be obtained and the multiplicand left set up in the machine. I, therefore, have referred to the "P" key as the "first product" key because subsequent products can be obtained by multiplying the same multiplicand by the same or different multipliers.

The connections operated by the "F. P." or "final product" key are separate and distinct from those operated by the "P" key and consist of a rod 325ᵃ connected to a bell crank 303ᵃ, in turn connected by link 305ᵃ to a T-shaped lever 307ᵃ whose forward extension 308ᵃ engages the pin 309 to draw down the bar 272 for the purpose and in the manner described with reference to corresponding parts operated by the "P" or "first product" key. A rearward extension 310ᵃ operated by the "F. P." key extends under pin 221ᵃ on a rock shaft 221 (see Fig. 3) so as to rock shaft 220 and raise supplemental levers 102ᵃ into engagement with the pin 217. At the same time, the rearward extension 310ᵃ engages a horizontal member of a bell crank 311, (see Figs. 2 and 4) and shifts the bell crank 317—314, the latter member of which carries the restoring bar 315, the former member being placed in the path of the pin 318 carried by the cam 97 and the shaft 81. In this manner, when the "final product" key is depressed, it operates similar to the "P" key in the patent before mentioned in that it raises the supplemental levers 102ᵃ so that the teeth 232 are raised out of engagement with the segments 233, but the supplemental levers 102ᵃ are not raised sufficiently high to engage the pins 217 on the main levers; the wheels 268 are drawn down into mesh with the racks; and the restoring bar 315 placed under control of a moving part of the machine. When the handle is pulled, the total or product will be yielded from the wheels 268 and the pendants 235 restored to zero position. If it is desired to introduce this "final product" key into a group of wheels 119, the "B" key is pulled forward so that the blocking plate b' will be received in the notch 180ᵇ and will occupy the position shown in Fig. 8, in which position the rearward extension 310ᵃ will not operate the cam shifting bell crank; but if it is desired to take a total or product direct from the wheels 268, restore the pendants to zero and not introduce said total or product into a group of wheels 268, the "B" key is pushed rearwardly, blocking the recess 180ᵇ over the extension 310ᵃ as shown in Fig. 9, so that when the "F. P." key is depressed, cams 82—109 will be shifted to their central or neutral position.

In Fig. 15, I have shown the "S" or subtraction key and its connections, the same comprising a rod 500 connected to a bar having a beveled edge located under the extension 180 of the cam shifting lever. This bar is connected to a lever 501 pivoted to the base plate of the machine, the opposite end of which is connected by a rod 502 to a lever 503 whose upper end coöperates with a lug 504 on the subtraction plate which coöperates with the pendants 185 in performing operations of subtraction. The operation of subtraction mechanism is disclosed in United States Letters Patent granted on an application filed by Hubert Hopkins, said patent being Number 1,118,489, and dated November 24, 1914, and do not claim the same here except in combination with the "E" key and its connections whereby a number represented by the pendants may be used either as a multiplicand, the partial products being accumulated in the wheels 268, or as a subtrahend, the complement of which is added to the minuend standing in wheels 268 and 1 automatically introduced into the units column when the subtraction key is operated, and the handle pulled, to indicate the correct remainder in wheels 268. Hence, wheels 268 may indicate the total of a series of numbers directly introduced thereinto from the key board; a product of any multiplicand represented by the pendants 235 and multiplied by the operation of the multiplier keys and pulling the handle as explained in the beforementioned patents; or a remainder, by subtracting the number represented by the pendants from the minuend standing in the wheels 268 by the method of complementary addition as set forth in Mr. Hopkins pending application just before referred to. The pendants 235 constitute what may be designated as setting up devices in which a number, multiplicand or subtrahend is represented or set up by the position of said pendants.

What I claim is:

1. In a calculating machine, the combination of variably positionable parts 235 which constitute setting up devices, a totalizer, a key board, means under control of the operator for setting up a number in the said devices and simultaneously introducing said number into said totalizer, and a key and its connections whereby a number may be set up in said devices independently of any operation of said totalizer.

2. In a calculating machine, the combination of variably positionable parts 235 which constitute setting up devices, a totalizer, means for positioning said parts to represent a number at the time that said number is introduced into said totalizer, and means under the control of the operator for returning said parts to zero position independently of any operation of said totalizer.

3. In a calculating machine, the combination of variably positionable parts which constitute setting up devices, means for positioning said parts to represent a number, two totalizers, a key and its connections whereby the number introduced into one of said totalizers will be simultaneously represented in said setting up devices, and another key and its connections whereby said setting up devices are placed in control of the other totalizer, and another key and its connections whereby the number represented in said last mentioned totalizer may be cleared therefrom independently of any operation of said first mentioned totalizer and setting up devices.

4. In a calculating machine, the combination of variably positionable parts constituting setting up devices for representing a number in the nature of a multiplicand or subtrahend, a totalizer, and a plurality of keys for placing said setting up devices in control of said totalizer for different arithmetical computations, such as multiplication and subtraction.

5. In a computing machine, the combination of variably positionable parts constituting setting up devices, a key board in control of said parts for positioning them to represent different numbers, a totalizer which is placed under control of said setting up devices for different arithmetical computations, a plurality of keys for determining such control and character of arithmetical computations, and another totalizer, and means in control of said last mentioned totalizer for placing the same under or out of control of the first mentioned totalizer whereby the results of the different arithmetical computations may be accumulated in said second totalizer at the will of the operator.

6. In a calculating machine, the combination of a field of pendants, means for positioning them to represent a number, a totalizer, and a plurality of keys and their connections in control of said totalizer and said pendants whereby said totalizer is actuated to indicate the results of different arithmetical computations.

7. In a computing machine, the combination of variably positionable parts constituting setting up devices, two independently operable sets of totalizer wheels, racks which are capable of being connected to and disconnected from said variably positionable parts, means for causing the engagement of either set of totalizer wheels with said racks at predetermined times, said means comprising shiftable cams, a plurality of keys and their connections in control of said totalizers and said cams, and adjustable means whereby said cams are placed out of and under control of certain of said keys at the will of the operator.

8. In a calculating machine, the combination of two totalizers, actuating devices therefor, means for placing a selected totalizer under or in control of said actuating devices, said means comprising a shifting element, a plurality of keys for operating said shifting element, and a blocking plate arranged on said shifting element for placing the same under or beyond the control of said keys and actuating devices for said shifting element.

9. In a calculating machine, the combination of plural groups of totalizer wheels, actuating devices therefor, a shifting element for placing a selected group of totalizer wheels under or in control of said actuating devices, means for actuating said shifting element, and movable devices carried by said shifting element whereby the same may be placed under or beyond control of its actuating means.

10. The combination of plural groups of totalizer wheels, actuating devices therefor, cams for placing a selected group of totalizer wheels under or in control of said actuating devices, a notched element for shifting said cams, a movable blocking plate upon said notched element for opening and closing the notches thereof, means for adjusting said blocking plate, and a plurality of keys coöperating with said notched shifting element and its blocking plate.

In testimony whereof I hereunto affix my signature in the presence of two witnesses, this 14th day of December, 1912.

OTTO THIEME.

Witnesses:
M. P. SMITH,
C. S. BUTLER.

Copies of this patent may be obtained for five cents each, by addressing the "Commissioner of Patents, Washington, D. C."